(12) United States Patent
Saxer

(10) Patent No.: US 8,804,132 B1
(45) Date of Patent: Aug. 12, 2014

(54) SHEAROGRAPHY FROM A MOVING PLATFORM

(75) Inventor: Christopher E Saxer, Chapel Hill, NC (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 407 days.

(21) Appl. No.: 13/357,554

(22) Filed: Jan. 24, 2012

Related U.S. Application Data

(60) Provisional application No. 61/435,542, filed on Jan. 24, 2011.

(51) Int. Cl.
*G01B 9/02* (2006.01)

(52) U.S. Cl.
USPC .......................................................... 356/520

(58) Field of Classification Search
CPC ........... G01B 9/02098; G01B 9/09094; G01B 9/09095; G01B 11/162
USPC .......................................................... 356/520
See application file for complete search history.

(56) References Cited

U.S. PATENT DOCUMENTS

| | | | |
|---|---|---|---|
| 7,538,891 B1 * | 5/2009 | Mello et al. | 356/520 |
| 7,933,003 B2 * | 4/2011 | Meldahl et al. | 356/28.5 |
| 8,411,279 B2 * | 4/2013 | Scott | 356/498 |

* cited by examiner

*Primary Examiner* — Jonathan Hansen
(74) *Attorney, Agent, or Firm* — Joseph Funk; Daniel J. Long

(57) ABSTRACT

A shearography system that operates while moving at significant speeds over a surface is disclosed. Two lasers are utilized and the distance between the two lasers is adjusted based on the altitude of the aircraft on which the shearography equipment is located, the speed of the aircraft, the distance between two lasers in the shearography equipment lasers, and the time difference between the laser pulses from each of the two lasers. The adjustment of the distance between the two lasers causes the angles of incidence and reflection to be the same for two sequential images and permits the moving shearography to work.

20 Claims, 4 Drawing Sheets

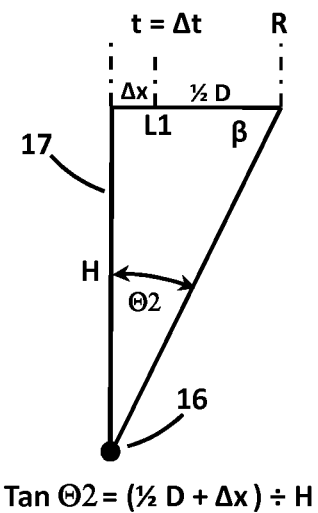
Tan Θ2 = (½ D + Δx) ÷ H
Figure 5
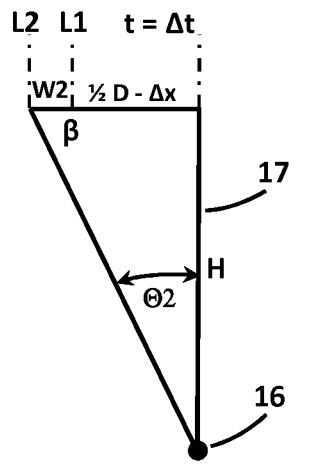
Tan θ2 = (W2 + ½ D – Δx) ÷ H
Figure 6
Tan Θ2 = (½ D + Δx) ÷ H = (W2 + ½ D – Δx) ÷ H
½ D + Δx = W2 + ½ D – Δx
W2 = 2 Δx
Figure 7

SHEAROGRAPHY FROM A MOVING PLATFORM

RELATED APPLICATIONS

This application claims the benefit of U.S. Provisional Application 61/435,542 filed Jan. 24, 2011, which is incorporated herein in its entirety by reference.

GOVERNMENT RIGHTS

The invention was made with United States Government support under Contract No. N00014-07-C-0292 awarded by the United States Government, Department of the Navy. The United States Government has certain rights in this invention.

FIELD OF THE INVENTION

The invention relates generally to a remote detection and imaging system. More specifically the invention relates systems and methods for automatically detecting electromagnetic energy reflected or scattered from an object, and determining therefrom information about the object.

BACKGROUND OF THE INVENTION

In shearography, a surface being observed is illuminated by an expanding laser beam, and two time sequential images are captured of the surface of a part with an image-shearing camera. The first image is taken of the surface, and the second image is taken of the same surface a short time thereafter after some deformation of the surface. The two images taken are processed together to produce a third image showing a fringe pattern that depicts the gradient of the displacement of the surface due to some loading of the surface between the first and second images.

More particularly, shearography is an optical measuring technique using coherent light, for the interferometric observation of the surfaces of parts typically under non-destructive thermal or mechanical loading to distinguish between structural information and anomalies of the surfaces of parts due to loading such as thermal or mechanical loading. The two images are each laterally displaced images taken of the surface of the part being observed and the two images are coherently superposed. The lateral displacement is called the shear of the images. The superposition of the two images is called a shearogram, which is an interferogram of an object wave with the sheared surface wave as a reference wave.

The absolute difference of two shearograms recorded at different physical loading conditions of the sample part is an interference fringe pattern which is directly correlated to the difference in the deformation state of the sample part between taking the two images thereof. In contrast to holographic interferometry the fringe pattern indicates the slope of deformation rather than the deformation itself. Defects inside the sample part will affect the local surface deformation induced by the loading and result in a disturbance of the loading fringes that is detected.

The resultant difference images always exhibit a very noisy structure. This is due to what are called speckles. Speckles are statistical interference patterns which occur after reflection of a coherent wave off a rough surface giving the image a grainy structure. Regarding shearography the speckles are the carrier of information, coding the wave field and surface state information respectively and giving rise to interference fringe patterns. However the grainy nature of the speckles is conserved and significantly decreases contrast and signal to noise ratio of the difference images.

The difference images typically exhibit strong noise and low contrast that require further image processing. This further image processing can be either image improvement or image evaluation. The goal is to remove speckle noise and to increase fringe contrast in order to improve the visibility of the fringes.

One shortcoming of existing shearography techniques is that they do not accommodate collecting shearography data from moving platforms such as aircraft, surface craft, or handheld devices. Thus, there is a need in the art for a way to collect shearography data from a moving platform.

SUMMARY OF THE INVENTION

The previously described need in the prior art for a way to collect shearography data for a subject target from a moving platform, such as an aircraft, surface craft, hand held device or moving vehicle, is met by the present invention.

It is known that specular light reflecting off of an object will be directed in an equal and opposite direction and angle to the light source when the light source is moved relative to the reflecting object. It has been determined that laser speckle often behaves similarly to specular reflections in that a laser speckle pattern is preserved if it is observed from an equal and opposite direction and angle as the light source when the light source is moved relative to an illuminated target object. This is the basis of the present invention.

In accordance with the teaching of the present invention, counter propagation of a laser illumination source of a shearography system allows the shearography receiver of the system to move in any direction with respect to a target during data collection. Counter propagation refers to the act of moving the laser source in an equal and opposite direction to the motion of the receiver as shearography data is collected from the target. It will be appreciated by those knowledgeable in the art that movement of a prior art shearography system with respect to a target changes the laser speckle reflected from the target so that the shearography data is useless. Therefore, changes in laser speckle due to motion of a shearography laser source and receiver with respect to a target of interest must be eliminated in order to isolate the reflected signal of interest being received from the target. As previously mentioned, speckles are statistical interference patterns which occur after reflection of a coherent wave off a surface giving the image a grainy structure. Regarding shearography the speckles are the carrier of information, coding the wave field and surface state information respectively and giving rise to interference fringe patterns that convey information regarding the target.

In operation the shearography system of the present invention is mounted on a platform that is on a moving vehicle, such as an aircraft, and the lasers and receiver of the shearography system are movably mounted with respect to each other on the platform. As the vehicle moves the angle of the shearography system laser transmitters with respect to the ground and a non-moving target on the ground, and the distance to the target, change.

The shearography system platform on the moving vehicle is mounted parallel to the ground and two lasers thereon each generate time spaced pulses. The pulses are expanding laser pulses that are directed perpendicular to the ground and they illuminate an area on the ground that is several meters across. An anomaly in the ground being illuminated by either of the laser beams from the two lasers will not be on the perpendicular line from the platform.

The aircraft on which the shearography equipment is mounted is relatively close to the ground and the ground is being deformed a small amount by a relatively high power low frequency sound wave that is directed toward the ground and vibrates same to deform it. The deformation of the ground is sufficient for the proper operation of the shearography equipment.

An expanding pulsed laser beam from a first of the two lasers impacts the ground below the vehicle, a portion is reflected from the vibrating ground and a first return signal is received by a shearography receiver that is located on the platform less than one foot from the first laser. Since the receiver is spaced close to the laser transmitters there is a small angle $\theta$ between a line from the laser to the anomaly in the ground, and a line from the anomaly to the receiver. The angle $\theta$ is equally divided by a bisector to create an angle $\theta/2$ between a line from the laser to the bisector, and to create an angle $\theta/2$ between a line from the receiver and the bisector.

From the moving vehicle a second laser pulse, time spaced from the first laser pulse impacts the vibrating ground below the vehicle, a portion of the laser signal is reflected, and a second return signal is received by shearography receiver. Since the vehicle is moving there is now a new, second small angle $\theta A$ between a line from the second laser to the anomaly in the ground, and a line from the anomaly to the receiver. The angle $\theta A$ is equally divided by a second bisector to create an angle $\theta A/2$ between a line from the second laser to the bisector, and to create an angle $\theta A/2$ between a line from the receiver and the bisector. The known and constant speed of the aircraft is used to determine a small distance that the second laser is moved relative to the receiver to achieve the same $\theta A/2$ angle so that the shearography can be performed.

The shearography receiver captures and stores both the first and second reflected laser beam images. The receiver has a wide enough field of view, in the order of several meters, and the receiver timing for taking the two images is calculated and adjusted based on the frequency of the sound transmitted toward and impacting the ground below the aircraft. The spacing of the second laser from the receiver is adjusted according to the constant speed of the aircraft. This is how the translation is accomplished to preserve the speckle pattern need for shearography from the moving vehicle.

Since a laser speckle pattern is preserved if it is observed from an equal and opposite direction and angle as the laser source is moved relative to an illuminated target or anomaly, and that is accomplished with the invention, the required speckle patterns are preserved for the two images. The two images are processed together to coherently superpose the two images and produce a third image showing a fringe pattern that depicts the gradient of the displacement of the surface of the ground due the deformation of the ground due to the high power low frequency sound impinging on the ground during the shearography process.

Stated another way, anomalies in the ground below the aircraft will affect the ground surface deformation induced by the high power low frequency sound transmitted toward the ground and result in a disturbance of the loading fringes that is detected as an indication of the presence of the anomalies.

DESCRIPTION OF THE DRAWINGS

The invention will be better understood upon reading the following Detailed Description in conjunction with the drawings in which:

FIG. 5 shows an optical receiver after it has moved a distance $\Delta x$ with respect to a vertical bisector to create an angle $\theta 2$;

FIG. 6 shows a first and second laser transmitters after they have both moved a distance $\Delta x$ with respect to a vertical bisector, and the position to which second laser transmitter is moved to create angle $\theta 2$ required for the moving shearography to work;

FIG. 7 shows the equations by which the distance the second laser transmitter is moved is calculated to create angle $\theta 2$ required for the moving shearography to work;

DETAILED DESCRIPTION

As previously described, counter propagation of a laser (coherent light) illumination source of a shearography system with respect to an optical receiver of the shearography system allows the receiver of the system to move in any direction with respect to a fixed target. More specifically, counter propagation is the act of moving the laser source in an equal and opposite direction to the motion of the optical receiver as shearography data is collected from the target.

Figure 1:
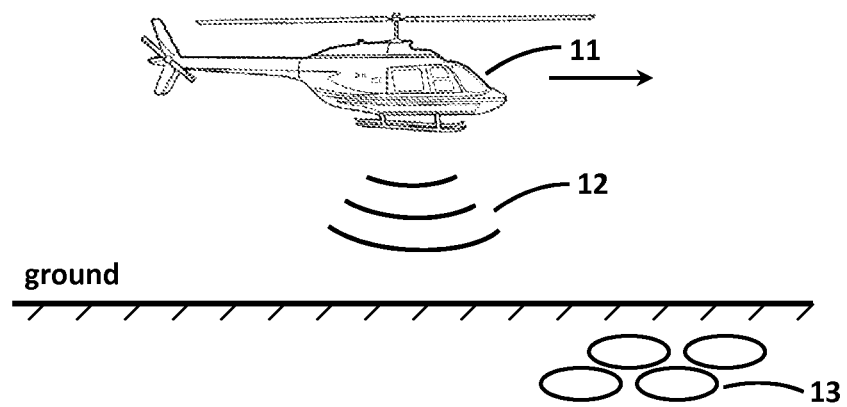
FIG. 1 shows an aircraft moving above the ground while transmitting a high intensity sound signal toward the ground to implement moving shearography.

FIG. 1 shows an aircraft 11 moving to the right above the ground while transmitting a high intensity sound signal 12 toward the ground. Sound signal 12 is utilized to cause sufficient vibration deformations of the ground required for moving shearography to operate. Buried in the ground are anomalies 13 that may be, for example, archaeological remains. Aircraft 11 preferably flies at an altitude between 100 feet and 500 feet at a speed of 40 mph. However, the altitude and speed may be varied, along with other operating variables, for specific applications. Sound signal 12 will typically be transmitted toward the ground at an intensity of 150 decibels, or at another intensity level so that at ground level the sound intensity is in the order of 120 decibels. The intensity level may be varied, depending on the makeup of the ground, to provide the vibration deformations of the ground required for the moving shearography to operate.

Figure 2:
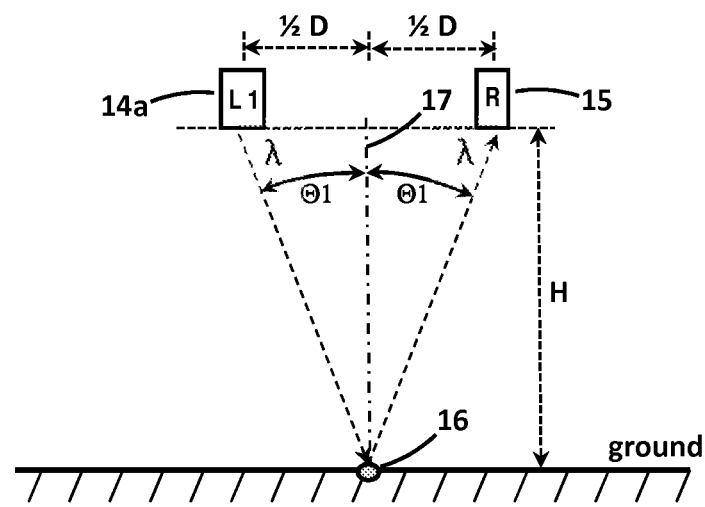
FIG. 2 is a simplified diagram that shows a first laser transmitter and an optical receiver positioned above the ground and showing the equal angles with respect to a vertical bisector required for shearography.

FIG. 2 is a simplified diagram showing a single laser transmitter (L1) 14a and an optical receiver (R) 15 spaced a distance D, positioned above the ground a distance H and showing equal angles $\theta 1$ with respect to a vertical bisector 17 based at point 16. The equal angles $\theta 1$ are required for shearography to operate as is well known. It can readily be appreciated that if laser transmitter (L1) 14a and receiver (R) 15 are both moving to the right with respect to point 16 equal angles $\theta$ will not be maintained with respect to vertical bisector 17 as two successive images are captured by receiver 15 as required for shearography to operate. This is the problem that is solved by the present invention.

If it is predetermined that aircraft 11 (FIG. 1) is to fly at a predetermined altitude of H and at a predetermined airspeed, and knowing the fixed spacing D between the first laser 14a and optical receiver 15 (R), one can calculate angle θ1 in FIG. 2 using the equation tan θ1=½D÷H.

Figure 3:
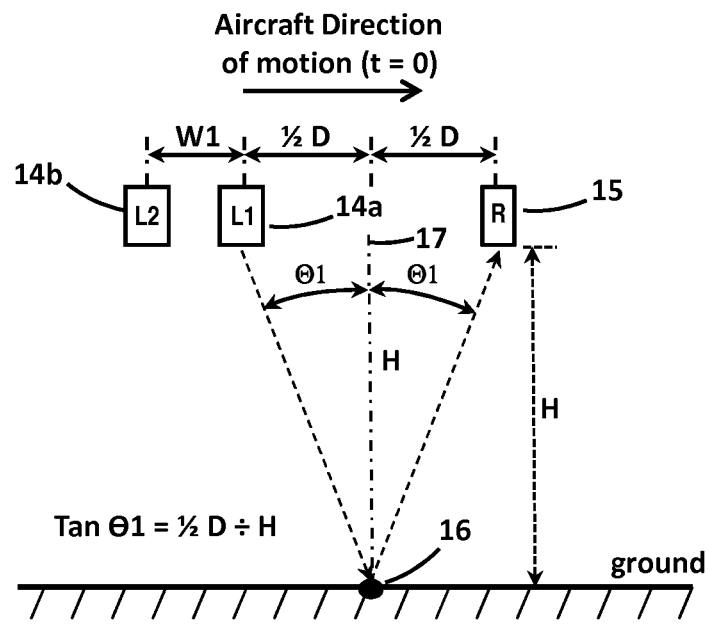
FIG. 3 is a simplified diagram showing both a first and a second laser transmitter and an optical receiver positioned above the ground over an anomaly to be used for moving shearography.

FIG. 3 is basically the same as FIG. 2 except a second laser transmitter (L2) 14b is shown that is used in implementing the present invention of moving shearography. Laser transmitter 14b is initially spaced from laser transmitter 14a by a distance W1 and each of laser transmitter 14a and optical receiver 15 are spaced from vertical bisector 17 a distance of D/2 as previously described. This creates equal angles θ1 with respect to bisector 17. As described in greater detail hereinafter, when the moving shearography system is in operation the distance between the laser transmitters L1 and L2 is adjusted so that equal bisector angles θ2 can be achieved for a second shearography image as shown in and described hereinafter with reference to FIG. 4. Before the aforementioned adjustment of the position of laser L2 to achieve the equal angles θ2 to perform moving shearography, transmitter 14b is initially spaced from transmitter 14a by a distance W1. FIG. 3 is shown at a time t=0.

Figure 4:
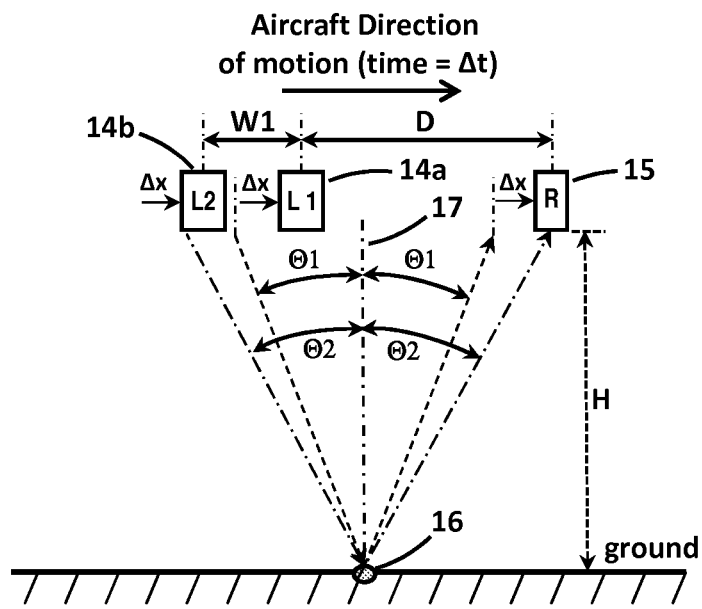
FIG. 4 is a diagram showing the distances and angles between first and second laser transmitters and an optical receiver after they have moved a small distance parallel to the ground during moving shearography.

FIG. 4 is basically the same as FIG. 3 except a time Δt has elapsed and moving aircraft 11 (not shown) and the novel shearography equipment thereon have all moved or been translated to the right by a distance Δx as shown. Δt is the time between taking two time sequential pictures using optical receiver 15 (R) for the moving shearography. Per the equation Δx=v·Δt (d=v·t) the distance Δx is the distance aircraft 11 moves during the time Δt and is dependent on the speed of aircraft 11 (aircraft 11 not shown in FIG. 4). It can readily be seen in FIG. 4 that the position of the second laser transmitter 14b at t=Δt will not place it in a position that will yield angle θ2 so that the novel moving shearography will work. Laser 14b must be moved to the left to a new location where its distance from laser 14a is W2 as described in more detail hereinafter.

W1 is the initial distance between laser transmitter 14a (L1) and laser transmitter 14b (L2) before any operational adjustments are calculated and made. Laser transmitter 14b (L2) must be moved to the left, as determined by the calculations shown in and described with reference to FIG. 7, away from laser transmitter 14a (L1), such that the distance between lasers 14a and 14b is W2 and this new position places laser transmitter 14b in a position to achieve equal bisector angles θ2 for the moving shearography to work. More specifically, the calculations for determining Δx are given in the previous paragraph, and the calculations for determining laser transmitter spacing W2 are understood with reference to FIGS. 5 and 6 and the equations shown in FIG. 7. First, for the example described herein, it is decided that during operation aircraft 11 will be moving from left to right in FIGS. 3 and 4 at a constant 40 mph. That speed is 704 inches/second. The second decision that must be made is the frequency of the high intensity sound signal 12 being directed at the ground in FIG. 1 to vibrate the ground for the moving shearography to operate properly. This frequency will typically be between 100 Hz and 500 Hz, but other frequencies may be utilized depending on the shearography being performed. The frequency chosen to vibrate the surface of the ground depends on the composition of the ground. If a frequency of 100 Hz is chosen the period of the sound signal is 0.01 second. Half this time is 0.005 second and is the time between the positive and negative amplitudes of the vibration that is utilized as the timing between the first laser pulse and the second laser pulse as is known in the shearography art. Using the equation d=v·t, with t=0.005 seconds and velocity v=704 inches/second from the previous paragraph, the translation or motion of receiver 15 is a distance of d=3.52 inches to the right in FIGS. 4 through 6. This distance is shown as Δx in FIGS. 4 through 7. In the preferred implementation, the initial distance W1 between laser transmitters 14a and 14b is changed to distance W2 which is 2 Δx at the planned average aircraft speed, and distance W2 is adjusted during flight to accommodate variations in the speed from the planned average speed.

FIG. 4 shows that with the initial spacing W1 between lasers 14a & 14b (FIG. 3) and, translating all the shearography equipment by a distance Δx to the right due to the motion of aircraft 11, laser transmitter 14b (L2) is not in the proper position to create angle θ2 with respect to bisector 17 in order to generate a second laser pulse to be used to capture the proper second shearography image utilizing optical receiver 15. However, it can be also seen in FIG. 4 that if laser 14b (L2) is moved to the left, away from laser transmitter 14a (L1), it will be in a position to achieve the same angle θ2 with respect to vertical bisector 17 that translated optical receiver 15 has with respect to bisector 17 at time Δt as shown in FIGS. 5 and 6. Thus, moving shearography may be properly performed. This adjustment of the distance between laser transmitters 14a and 14b is better shown in and described with reference to FIGS. 5 through 7.

Using the equation d=v·t, and with the example t=0.005 seconds and velocity v=704 inches/second, the translation of receiver 15 is a distance of d=3.52 inches to the right in FIGS. 4 and 5. This distance is shown as Δx in FIGS. 4 through 7.

FIGS. 5 through 7 best show and describe how revised laser transmitter spacing W2 (FIG. 6) is calculated and the position of laser transmitter 14b adjusted from its initial spacing W1 to spacing W2 before the moving shearography system is placed in operation.

FIG. 5 is a triangle showing optical receiver 15 (R), originally spaced a distance ½ D from vertical bisector 17 (FIG. 2), at time t=Δt after it has moved to the right a distance Δx. Laser transmitter 14a (L1) and optical receiver 15 (R) are both a distance H above the ground. In FIG. 5 it can be seen that tan θ2=(½ D+Δx)÷H and the value of angle θ2 can be calculated since D, Δx and H are all known. This equation is also shown in FIG. 7

FIG. 6 is a triangle showing the new spacing W2 of laser transmitters 14a (L1) and 14b (L2) with respect to vertical bisector 17 after they have moved to the right by a distance Δx as previously described with reference to FIG. 4. It is seen that tan θ2=(½ D−Δx+W2)÷H where W is the distance between laser transmitters 14a (L1) and 14b (L2) after the position of laser transmitter L2 has been moved to achieve the angle θ2. Theta has been calculated as described in the previous paragraph, and D and Δx are known. The only unknown is W2 and it can be calculated. The spacing of laser transmitters 14a and 14b are then adjusted to W2.

FIG. 7 shows the basic trigonometry used for calculating the revised spacing W2 between laser transmitters 14a and 14b to make the moving shearography operate. As previously described, the distance D and altitude H are known and the distance Δx has been calculated. The equations for tan θ2 with respect to FIGS. 5 and 6 are as described above. With tan θ2 in FIGS. 5 and 6 being equal, in FIG. 7 we show how distance W2 is calculated. A CPU 21 (FIG. 8) makes these calculations and causes laser transmitter 14b (L2) to be moved to be spaced the revised distance W2 from first laser transmitter 14a (L1). In their positions shown in FIGS. 5 and 6 laser 14b (L2) and optical receiver 15 (R) both create an angle θ2 with respect to vertical bisector 17 and the moving shearography can operate properly.

Stated another way, the imaging receiver 15 moves with the aircraft (aside from the heading compensation). The forward motion Δx=v·Δt of receiver 15 creates the angle θ at which each point on the ground is viewed to change slightly between laser pulses from θ1 to θ2. For example, if the system is looking nadir from a height H and moves by a distance Δx, the view angle of the point 16 on the ground appears to change by approximately Δθ=arctan (Δx÷H). Δθ=θ2−θ1. The first image is captured at an angle θ1 and the second image is captured at an angle θ2 unless the aircraft speed is zero. This is accomplished by translating the laser beam of laser 14b opposite the flight direction to a position of −2Δx with respect to laser 14a (L1) where laser 14b is positioned properly. The actual distance of the translation of laser 14b may be to the right or to the left depending on the altitude and speed and the original spacing W between the two laser transmitters 14a and 14b.

Figure 8:
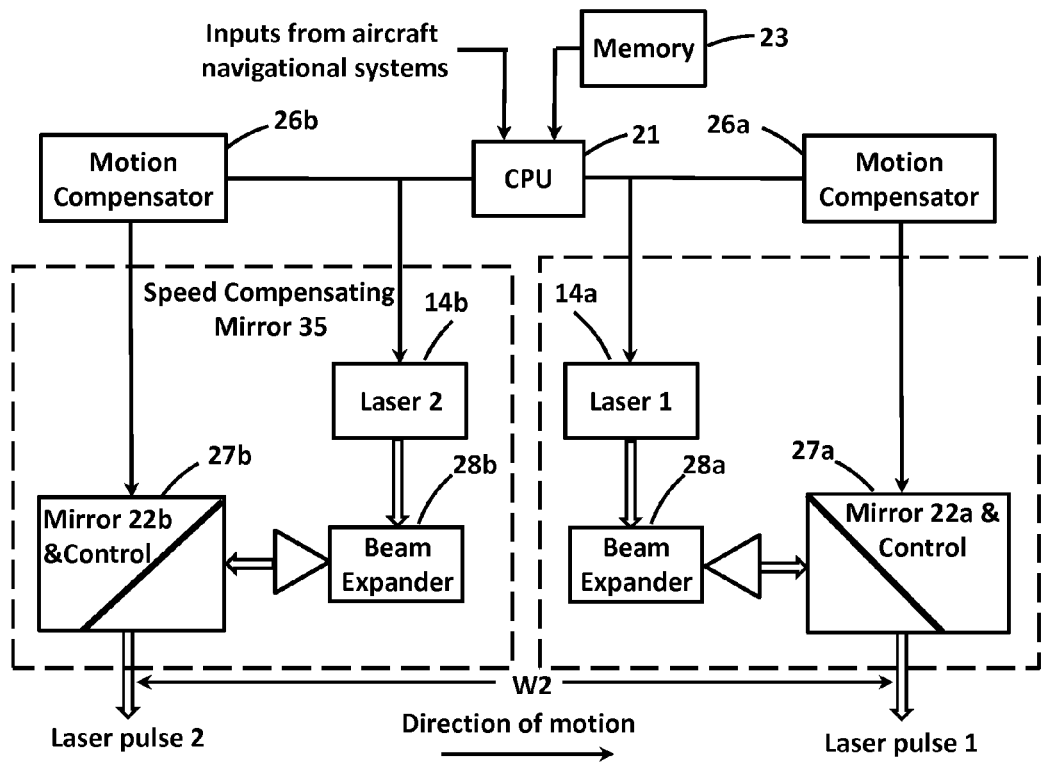
FIG. 8 is a block diagram of dual lasers of a shearography system that can be used on a moving aircraft to implement moving shearography.

FIG. 8 is a block diagram showing more details of dual laser transmitters 14a (L1) and 14b (L2) of the moving shearography system of the present invention. The system utilizes two spaced lasers 14a and 14b that generate Laser Beams 1 & 2 that pass through beam expanders 28a and 28b and are respectively reflected off mirrors 22A and 22B and directed toward the ground. Laser Beams 1 and 2 each have a wavelength of 532 nanometers. Two lasers are utilized due to the very short time between two laser pulses required to create the interference patterns for the shearography. As previously described that time difference is only several milliseconds. The two laser beams 1 and 2 are expanded respectively by their beam expanders 28a and 28b to have a diameter of 2 meters on the surface of the ground below aircraft 11. Beam expanders are well known in the art and examples may be seen in U.S. Pat. Nos. 4,205,902 and 6,157,756.

One advantage of using shearography for application on moving and vibrating vehicles is that shearography performs interferometry without the use of a local oscillator. Briefly, the laser light reflected from a target surface and entering the receiver is split into two identical images, one of which is subsequently displaced in the image plane. This displacement is called a shear. The two copies of the image are subsequently recombined on at the focal plane of the optics and interfere with each other, making a speckle pattern. The device for performing this splitting, shearing and recombination is called a shearing interferometer. In the preferred implementation, the shearing interferometer is of the Michelson type, though a wide variety of other types can also be used. The speckle pattern includes speckles whose phases are modulated as a result of movement or deformation of the target surface. By using a shearing interferometer, the reflected laser image becomes self-referencing, rendering platform vibrations, surface roughness, and air-density variations as common-mode variations that are identical over a series of laser pulses. All the common-mode effects can be then removed by subtraction or similarly straightforward arithmetic operations on the images.

As previously described, lasers 14A (L1) and 14B (L2) are initially spaced a distance W1 apart as shown in FIGS. 3 and 4, but their spacing is changed to W2 as shown in and described with reference to FIGS. 5 through 8 after the preliminary calculations are performed for the motion shearography. As described with reference to the equations in FIG. 7 W2=2Δx. As may be seen in FIG. 8, the spacing between Laser Beams 1 & 2 are adjusted to the distance W2 before operation, not the actual lasers 14a and 14b that generate the laser beams that are reflected off the mirrors 22a and 22b. The spacing of laser 14b (L2) with respect to laser 14a (L1) to W2 is adjusted prior to operation of the shearography system based upon the speed of aircraft 11 (not shown in this figure) and the timing between the laser pulses from the two lasers as described hereinabove with reference to all the equations. The initial spacing W1 between laser 14a and laser 14b is W1 but is adjusted to W2 (2Δx), as described hereinabove, so that the angle of both laser 14b and receiver 15 with respect to vertical bisector 17 is angle θ2 as shown in FIGS. 5 and 6. CPU 21 controls when laser 14a (L1) and laser 14b (L2) provide their respective pulsed laser outputs. As described above, for one example, the pulsed outputs are spaced 5 milliseconds apart.

Responsive to the two sequential laser pulses both a first image and a second image are captured by optical receiver 15. Two lasers 14a and 14b are utilized in this embodiment of the invention because they are transmitting sequential laser pulses spaced less than five milliseconds apart.

There is a CPU 21 that operates under control of a program stored in memory 23 that runs the novel moving shearography system. For setup, CPU 21 uses the planned speed of the aircraft, its flying altitude and the nature of the ground below (time between pulses) to calculate how and when lasers 14a and 14b fire, and calculates the position W2 of laser 14a with respect to laser 14a to achieve equal angles θ2 for the firing position of laser 14B as shown in FIGS. 5 and 6. The algebra and trigonometry associated with these calculations has been previously described with reference to FIG. 7. In addition, CPU 21 controls motion compensators 18 and 19 which, in turn, control mirror position compensating circuits 27a&b. Mirrors 22a and 22b are mounted such that their position can be easily and quickly changed in more than one plane responsive to calculations made by CPU 21.

The horizontal position of mirror 22b is adjusted by CPU 21 using motion compensator 26b to set the distance W2 between laser beams 1 and 2 in FIG. 8. In addition, the angular position of mirror 22b may be adjusted to aim laser beam 2 at point 16 on the ground. In the description of FIG. 5 it is described how the angle θ2 is calculated. Since vertical bisector 17 forms a right angle with the top of the triangle in FIG. 5, the angle β is easily determined. Angle θ2+angle β=ninety degrees and angle θ2 is known. The angular position of mirror 22b is adjusted according to angle β and laser beam 2 is thereby aimed at point 16 on the ground. Similarly, using the same mathematics the angular position of mirror 22a may be adjusted to an angle λ (see FIG. 2) to point laser beam 1 toward position 16 on the ground.

During flight the air speed of aircraft 11 may change due to head winds and tail winds that must be compensated for. CPU 21 has inputs from navigational systems of aircraft 11 that include, but are not limited to, highly accurate GPS readings that may be used to determine the airspeed and heading of aircraft 11 on a second by second basis. As the airspeed changes from the value used during initial setup (40 mph) the distance Δx will change accordingly. CPU 21 makes calculations that readjust the horizontal position of mirror 22b to change the spacing W2 between laser beam 1 and laser beam 2 to match the new airspeed.

In addition, due to various side wind conditions the aircraft experiences during flight it will experience yaw that changes the heading of the aircraft and it must be corrected. These conditions change the direction that aircraft 11 actually points as it flies (yaw). Using the same highly accurate GPS readings that are described in the previous paragraph CPU 21 makes calculations that are used by motion compensator 26a to control the position of mirror 22a to compensate for the yaw.

Figure 9:
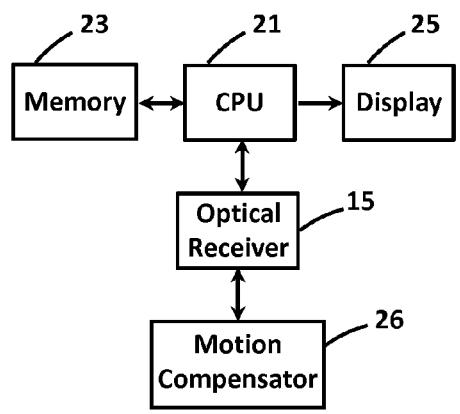
FIG. 9 is a simplified block diagram of the optical receiver of a shearography system that can be used on a moving aircraft to implement moving shearography.

FIG. 9 shows a block diagram of the optical receiver 15 (R) shown in FIGS. 2 through 5. Receiver 15 operates under control of CPU 15 per a program stored in memory 23. Responsive to the stored program, which also controls the generation of the sequential pulses from lasers 14a and 14b, the images created on optical receiver 15 by the laser beams reflected from the ground and including an anomaly at point 16 are captured and stored in memory 23 for further processing as generally described in the following paragraphs.

The pairs of shearographic images collected and stored in memory 23, as described in the previous paragraphs, will include speckle patterns that are processed in a manner known in prior art shearography, which speckle patterns are not shown in FIG. 9. Briefly, the images captured are digitized by an image digitizer and stored in frame buffers that reside in a video processor that are lumped under CPU 15 herein. Because of the action of various natural and/or anthropogenic sources, by the time the next speckle pattern is received and stored, the object's surface may be deformed from its state in the first speckle pattern captured in the previous image. The deformation can be the result of surface vibrational motion, thermal stressing, or mechanical loading. In the present invention the vibrational motion is created by the high intensity sound waves 12 transmitted from aircraft 11 as shown in FIG. 1. A first composite image is then formed by adding the first and second speckle patterns, digitizing the image, and storing it in the frame buffers. A second composite image is formed by repeating the process of adding two sheared speckle images captured by optical receiver 15. The second composite image is also digitized and stored in the frame buffers.

When the first composite image is subtracted from the second composite image using CPU 21, speckle fringes or contours result. The speckle contour image reveals the spatial structure of the micro-displacements of the object surface, in the present case the surface of the earth. The resulting speckle contour image is displayed on an image display 25 inch and shows anomalies such as those designated 13 in FIG. 1.

Stated another way, when a surface area is illuminated with a highly coherent laser light, a stochastical interference pattern is created. This interference pattern is called a speckle, and is projected on an image camera's CCD chip. To obtain results from the speckle we need to compare it with a known reference light. Shearography uses the test object itself as the known reference; it shears the image so a double image is created. The superposition of the two images, a shear image, represents the surface of the test object at this unloaded state. This makes the method much more insensible to external vibrations and noise. By applying a small load, the material will deform. A non-uniform material quality will generate a non-uniform movement of the surface of the test object. A new shearing image is recorded at the loaded state and is compared with the sheared image before load.

When an anomaly of interest is seen or detected in a shearography shear image and the anomaly is to be investigated further, an operator of the system may push a button or provided another indication to this effect. Responsive thereto the moving shearography system stores both the shear image and highly accurate global positioning information from the navigation system of the moving platform. In this manner people may be alerted to act on the information, for example by investigating, avoiding, or neutralizing the anomaly. Alternatively, the accurate global positioning information may be stored for every shear image. Also, a program may be used to analyze shear images and when there is a predetermined level of change in a shear image a decision is made to store same along with its global positioning information.

While what has been described hereinabove is a preferred embodiment of the invention, those skilled in the art will recognize that numerous changes may be made without departing from the spirit and scope of the invention. For example, moving shearography may be performed in a manufacturing setting wherein a sheet of material, such as sheet steel, passes underneath the novel moving shearography equipment and anomalies in the sheet steel are seen and analyzed for quality control purposes. It is also possible that the novel moving shearography may be performed when both the shearography equipment and something beneath it are both moving but in different directions.

The invention claimed is:

1. Apparatus for performing shearography from a platform that is moving at a known velocity above and over a surface, at a known distance above the surface, and the timing between pairs of coherent laser light pulses directed toward the surface from the moving platform is known, the apparatus comprising:
   (a) first laser means for generating a first of the pairs of pulses of coherent light onto the surface;
   (b) an optical receiver positioned a known distance from the first laser means for receiving the coherent light from the first laser means that is reflected from the surface;
   (c) second laser means for generating a second of the pairs of pulses of coherent light onto the surface, the second laser means being spaced a known distance from the first laser means, and the second laser means being movable to change the distance between the first laser means and the second laser means, and the optical receiver receives the coherent light from the second laser means that is reflected from the surface; and
   (d) means for changing the distance between the first laser means and the second laser means dependent on the velocity of the moving platform, the distance of the moving platform above the surface, and the timing between the first of each pair of pulses of coherent light and the second of each pair of pulses of coherent light, the changed distance between the first laser means and the second laser means permitting the shearography to be performed.

2. The apparatus for performing shearography from a platform that is moving at a known velocity above and over a surface in accordance with claim 1 further comprising means for projecting a beam of energy from the platform toward the surface that causes the surface to be stressed.

3. The apparatus for performing shearography from a platform that is moving at a known velocity above and over a surface in accordance with claim 2 wherein the optical receiver captures a first image as a result of the received coherent light from the first laser means that is reflected from the surface; and wherein the optical receiver captures a second image as a result of the received coherent light from the second laser means that is reflected from the surface.

4. The apparatus for performing shearography from a platform that is moving at a known velocity above and over a surface in accordance with claim 3 wherein each first captured image and each second captured image are processed together to yield a third image that yields information about the surface.

5. The apparatus for performing shearography from a platform that is moving at a known velocity above and over a surface in accordance with claim 4 further comprising a processor unit processing a stored program to use the velocity of the moving platform, the distance of the moving platform above the surface, and the timing between the first of each pair of pulses of coherent light and the second of each pair of pulses of coherent light to control the means for changing the distance between the first laser means and the second laser means.

6. The apparatus for performing shearography from a platform that is moving at a known velocity above and over a surface in accordance with claim 5 further comprising a first mirror that receives the coherent light from the first laser means and reflects it toward the surface to be reflected therefrom to the optical receiver.

7. The apparatus for performing shearography from a platform that is moving at a known velocity above and over a surface in accordance with claim 6 further comprising a movable second mirror that receives the coherent light from the first laser means and reflects it toward the surface to be reflected therefrom to the optical receiver, the second mirror being moved to change the distance between the first laser means and the second laser means.

8. The apparatus for performing shearography from a platform that is moving at a known velocity above and over a surface in accordance with claim 1 further comprising a processor unit processing a stored program to use the velocity of the moving platform, the distance of the moving platform above the surface, and the timing between the first of each pair of pulses of coherent light and the second of each pair of pulses of coherent light to control the means for changing the distance between the first laser means and the second laser means.

9. The apparatus for performing shearography from a platform that is moving at a known velocity above and over a surface in accordance with claim 8 further comprising a first mirror that receives the coherent light from the first laser means and reflects it toward the surface to be reflected therefrom to the optical receiver.

10. The apparatus for performing shearography from a platform that is moving at a known velocity above and over a surface in accordance with claim 9 further comprising a movable second mirror that receives the coherent light from the first laser means and reflects it toward the surface to be reflected therefrom to the optical receiver, the second mirror being moved to change the distance between the first laser means and the second laser means.

11. The apparatus for performing shearography from a platform that is moving at a known velocity above and over a surface in accordance with claim 10 wherein the optical receiver captures a first image as a result of the received coherent light from the first laser means that is reflected from the surface; and wherein the optical receiver captures a second image as a result of the received coherent light from the second laser means that is reflected from the surface.

12. The apparatus for performing shearography from a platform that is moving at a known velocity above and over a surface in accordance with claim 11 further comprising means for projecting a beam of energy from the platform toward the surface that causes the surface to be stressed.

13. The apparatus for performing shearography from a platform that is moving at a known velocity above and over a surface in accordance with claim 8 further comprising a movable mirror that receives the coherent light from the first laser means and reflects it toward the surface to be reflected therefrom to the optical receiver, the mirror being moved to change the distance between the first laser means and the second laser means.

14. Apparatus for performing shearography from a platform that is moving at a known velocity above and over a surface, at a known distance above the surface, and the timing between pairs of coherent laser light pulses directed toward the surface from the moving platform is known, the apparatus comprising:
    (a) first laser means for generating a first of the pairs of pulses of coherent light onto the surface;
    (b) an optical receiver positioned a known distance from the first laser means for receiving the coherent light from the first laser means that is reflected from the surface;
    (c) second laser means for generating a second of the pairs of pulses of coherent light onto the surface, the second laser means being movable, and the optical receiver receives the coherent light from the second laser means that is reflected from the surface; and
    (d) means for moving the second laser means a distance dependent on the velocity of the moving platform, the distance of the moving platform above the surface, and the timing between the first of each pair of pulses of coherent light and the second of each pair of pulses of coherent light, the changed distance permitting the shearography to be performed.

15. The apparatus for performing shearography from a platform that is moving at a known velocity above and over a surface in accordance with claim 14 further comprising a processor unit processing a stored program to use the velocity of the moving platform, the distance of the moving platform above the surface, and the timing between the first of each pair of pulses of coherent light and the second of each pair of pulses of coherent light to control the means for moving the second laser means to permit the shearography to be performed.

16. The apparatus for performing shearography from a platform that is moving at a known velocity above and over a surface in accordance with claim 15 further comprising a first mirror that receives the coherent light from the first laser means and reflects it toward the surface to be reflected therefrom to the optical receiver.

17. The apparatus for performing shearography from a platform that is moving at a known velocity above and over a surface in accordance with claim 16 further comprising a movable second mirror that receives the coherent light from the first laser means and reflects it toward the surface to be reflected therefrom to the optical receiver, the second mirror being moved by the means for moving the second laser means to permit the shearography to be performed.

18. The apparatus for performing shearography from a platform that is moving at a known velocity above and over a surface in accordance with claim 14 further comprising means for projecting a beam of energy from the platform toward the surface that causes the surface to be stressed.

19. The apparatus for performing shearography from a platform that is moving at a known velocity above and over a surface in accordance with claim 18 wherein the optical receiver captures a first image as a result of the received coherent light from the first laser means that is reflected from the surface; and wherein the optical receiver captures a second image as a result of the received coherent light from the second laser means that is reflected from the surface.

20. The apparatus for performing shearography from a platform that is moving at a known velocity above and over a surface in accordance with claim 19 wherein each first captured image and each second captured image are processed together to yield a third image that yields information about the surface.

* * * * *